United States Patent
Nakasone et al.

(10) Patent No.: US 11,274,592 B2
(45) Date of Patent: Mar. 15, 2022

(54) CATALYST DETERIORATION DIAGNOSIS DEVICE AND CATALYST DETERIORATION DIAGNOSIS METHOD

(71) Applicant: NGK INSULATORS, LTD., Aichi (JP)

(72) Inventors: Osamu Nakasone, Inabe (JP); Kosuke Monna, Frankfurt am Main (DE)

(73) Assignee: NGK INSULATORS, LTD., Nagoya (JP)

( * ) Notice: Subject to any disclaimer, the term of this patent is extended or adjusted under 35 U.S.C. 154(b) by 238 days.

(21) Appl. No.: 16/594,240

(22) Filed: Oct. 7, 2019

(65) Prior Publication Data
US 2020/0109656 A1    Apr. 9, 2020

(30) Foreign Application Priority Data

Oct. 9, 2018  (JP) .............................. JP2018-190934

(51) Int. Cl.
  *F01N 11/00*   (2006.01)
  *F02D 41/14*   (2006.01)
  *G01M 15/10*   (2006.01)
(52) U.S. Cl.
  CPC ........ *F01N 11/007* (2013.01); *F02D 41/1446* (2013.01); *F01N 2550/02* (2013.01); *F01N 2560/023* (2013.01); *F01N 2560/026* (2013.01); *F01N 2560/06* (2013.01); *F01N 2900/1404* (2013.01); *F02D 2200/0802* (2013.01); *G01M 15/102* (2013.01)
(58) Field of Classification Search
  None
  See application file for complete search history.

(56) References Cited

U.S. PATENT DOCUMENTS

| 5,526,643 | A  | * | 6/1996 | Mukaihira | F01N 9/005 60/276 |
| 6,564,543 | B1 | * | 5/2003 | Orzel | F01N 13/009 60/277 |
| 7,114,326 | B2 | * | 10/2006 | Mukaihira | F01N 11/005 60/277 |
| 8,091,404 | B2 | * | 1/2012 | Sawada | F02D 41/1461 73/1.06 |
| 8,132,450 | B2 | * | 3/2012 | Shibata | F01N 11/002 73/114.75 |
| 8,245,567 | B2 | * | 8/2012 | Wang | F01N 11/007 73/114.75 |
| 8,359,826 | B2 | * | 1/2013 | Kitazawa | F02D 41/1461 60/277 |
| 9,638,122 | B2 | * | 5/2017 | Smith | F02D 41/0235 |
| 10,302,002 | B2 | * | 5/2019 | Hagiwara | F01N 3/0885 |
| 10,385,753 | B2 | * | 8/2019 | Nobukawa | F01N 11/00 |

(Continued)

FOREIGN PATENT DOCUMENTS

JP     2006-017078 A     1/2006

*Primary Examiner* — Freddie Kirkland, III
(74) *Attorney, Agent, or Firm* — Mattingly & Malur, PC

(57) ABSTRACT

A catalyst deterioration diagnosis device includes: a unit configured to obtain a temperature of a catalyst; a unit configured to obtain a sensor output from a gas sensor disposed between the catalyst and an exhaust port; and a unit configured to determine the catalyst to be faulty when the temperature of the catalyst obtained when the sensor output becomes a preset evaluative output is equal to or higher than an evaluative catalyst temperature.

12 Claims, 12 Drawing Sheets

(56) References Cited

U.S. PATENT DOCUMENTS

| | | | |
|---|---|---|---|
| 10,428,717 B2* | 10/2019 | Monna | F01N 3/10 |
| 2015/0176512 A1* | 6/2015 | Smith | F01N 3/2066 60/274 |
| 2018/0010506 A1* | 1/2018 | Monna | F01N 3/103 |

* cited by examiner

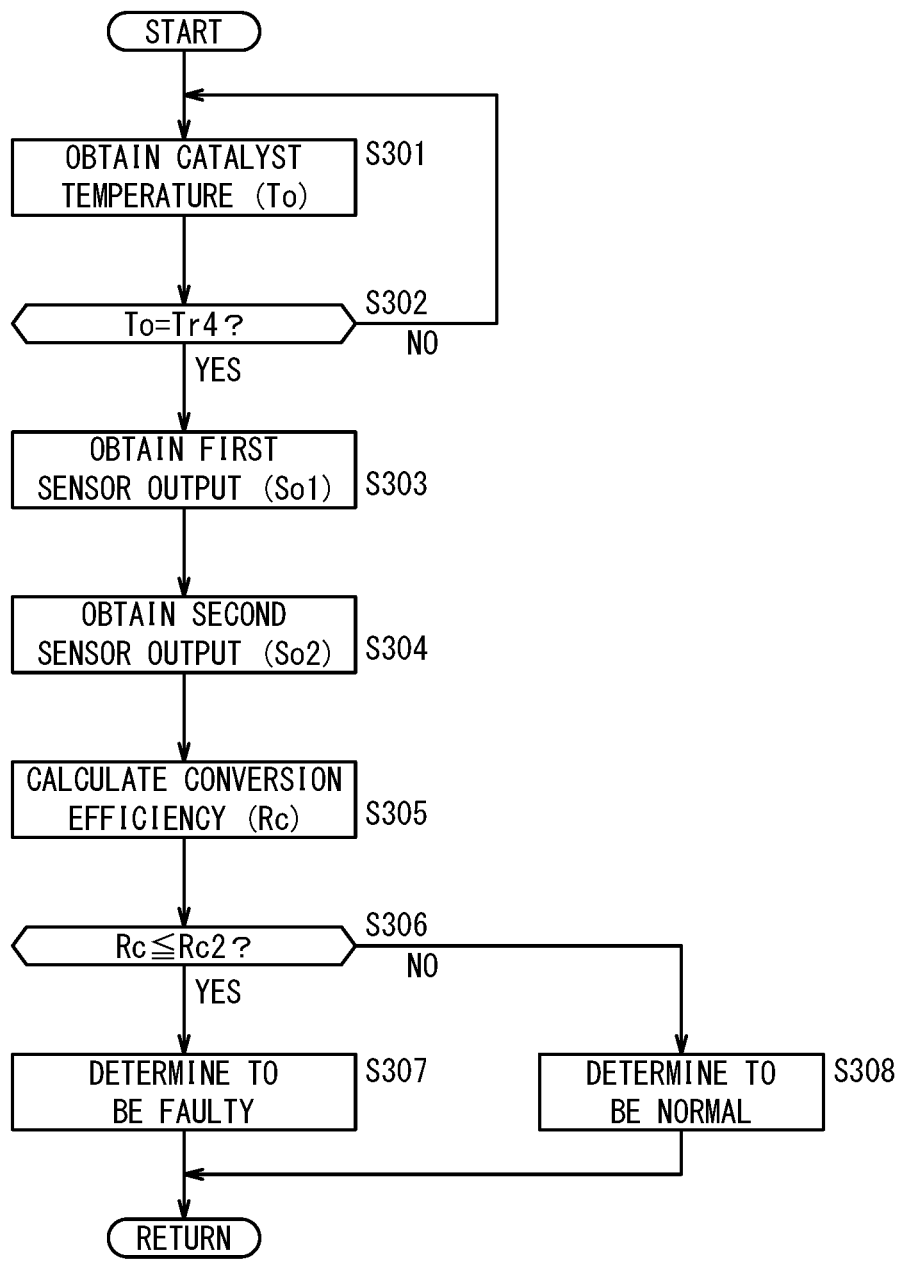

CATALYST DETERIORATION DIAGNOSIS DEVICE AND CATALYST DETERIORATION DIAGNOSIS METHOD

CROSS-REFERENCE TO RELATED APPLICATION

This application is based upon and claims the benefit of priority from Japanese Patent Application No. 2018-190934 filed on Oct. 9, 2018, the contents of which are incorporated herein by reference.

BACKGROUND OF THE INVENTION

Field of the Invention

The present invention relates to a device for diagnosing deterioration of a catalyst disposed between a combustion device and an exhaust port, and a method for diagnosing deterioration of such a catalyst.

Description of the Related Art

According to the catalyst deterioration determining device described in Japanese Laid-Open Patent Publication No. 2006-017078, during a forced air-fuel ratio setting control for checking the three-way catalyst for deterioration, checking for abnormality of an $O_2$ sensor disposed downstream of the catalyst and having a Z output characteristic is further carried out, in order to achieve its object of generally suppressing deterioration of emissions and drivability (paragraph [0010], Abstract).

In order to achieve this object, according to the catalyst deterioration determining device of Japanese Laid-Open Patent Publication No. 2006-017078, the air-fuel ratio as the target of control on the upstream side of the catalyst is set to a set lean air-fuel ratio or a set rich air-fuel ratio so as to check for deterioration of the three-way catalyst provided on the exhaust passage. The $O_2$ sensor is provided to detect that the air-fuel ratio on the downstream side of the catalyst has switched from the initial rich or lean air-fuel ratio to the lean or rich air-fuel ratio across a threshold value. Presence/absence of deterioration of the three-way catalyst is determined on the basis of the detection. A variation rate $\Delta v/\Delta t$ of the detection value of the $O_2$ sensor is also checked at this point. If the detection value of the $O_2$ sensor shows a stable value without crossing the threshold value, it is detected as a fault of the $O_2$ sensor and the forced air-fuel ratio setting control is immediately stopped.

SUMMARY OF THE INVENTION

According to the gas sensor described in Japanese Laid-Open Patent Publication No. 2006-017078, a fault detection utilizing OSC (Oxygen Storage Capacity) is performed using the oxygen sensors attached upstream and downstream of the three-way catalyst.

Particularly, recent automobiles' fuel consumption is lowered to achieve $CO_2$ reduction, and there is a tendency that the catalyst temperature does not increase. Also, hybrid cars, using both a battery and an internal combustion engine as the driving source for running, employ the internal combustion engine less frequently and hence the exhaust gas temperature is not raised and temperatures suitable for catalyst deterioration diagnosis are much less frequently achieved.

On the other hand, the importance of functional diagnosis of exhaust emission purification components has been increased due to international emissions regulations, and it is becoming difficult to make such diagnosis by means of the current OSC method also in respect of In Use Performance Ratio (IUPR) regulation during actual running.

Furthermore, on-board fault diagnosis devices utilizing OSC have the following problems.

(1) Disagreement Between $O_2$ Storage Capacity and NOx Conversion Efficiency

This is due to the fact that in some cases the $O_2$ storage capacity and NOx conversion efficiency are not correlated because of existence of deteriorated portion of the catalyst.

(2) Errors Due to Deterioration of Components Used for Fault Detection

This is due to reductions of response speeds of the oxygen sensor disposed upstream of the catalyst and the oxygen sensor disposed downstream of the catalyst.

(3) Errors in Fault Detection Due to Environments

The errors include calculation errors of the amount of OSC caused by shift of the output of the oxygen sensor due to generation of $H_2$ at the catalyst, calculation errors of $O_2$ storage amount based on $CO_2$ adsorption due to long stoppage etc., calculation errors of the accumulated amount of $O_2$ due to misdiagnosis with EGR amount/air amount, and so on.

(4) Limited Opportunities to Make Catalyst Deterioration Diagnosis

Precise measurement requires conditions such as temperatures around 500° C. at which the catalyst is activated, an appropriate amount of air, appropriate engine speed, etc., which are achieved only in very limited opportunities during running. The catalyst takes several tens of seconds to reach a given temperature after engine start.

(5) Diagnosis Takes Time, about 10 Seconds, Because it Needs Transition Between Rich and Lean.

The present invention has been made taking such problems into consideration, and an object of the present invention is to provide a catalyst deterioration diagnosis device and a catalyst deterioration diagnosis method that can solve problems of fault detection utilizing OSC (Oxygen Storage Capacity), can perform catalyst deterioration diagnosis very precisely in a short time, and are suitable also for on-board fault diagnostics.

According to a first aspect of the present invention, a catalyst deterioration diagnosis device that diagnoses deterioration of a catalyst disposed on an exhaust side of a combustion device includes: a unit configured to obtain a temperature of the catalyst; a unit configured to obtain a sensor output from a gas sensor disposed between the catalyst and an exhaust port; and a unit configured to determine the catalyst to be faulty when the temperature of the catalyst obtained when the sensor output becomes a preset evaluative output is equal to or higher than a preset evaluative catalyst temperature.

According to a second aspect of the present invention, a catalyst deterioration diagnosis device that diagnoses deterioration of a catalyst disposed on an exhaust side of a combustion device includes: a unit configured to obtain a temperature of the catalyst; a unit configured to obtain a sensor output from a gas sensor disposed between the catalyst and an exhaust port; and a unit configured to determine the catalyst to be faulty when the sensor output obtained when the temperature of the catalyst becomes a preset evaluative catalyst temperature is equal to or greater than a preset evaluative output.

According to a third aspect of the present invention, a catalyst deterioration diagnosis device that diagnoses deterioration of a catalyst disposed on an exhaust side of a combustion device includes: a unit configured to obtain a temperature of the catalyst; a unit configured to obtain a first sensor output from a first gas sensor disposed between the combustion device and the catalyst; a unit configured to obtain a second sensor output from a second gas sensor disposed between the catalyst and an exhaust port; and a unit configured to determine the catalyst to be faulty when the temperature of the catalyst at a time when a conversion efficiency obtained with the first sensor output and the second sensor output becomes a preset evaluative conversion efficiency is equal to or higher than a preset evaluative catalyst temperature.

According to a fourth aspect of the present invention, a catalyst deterioration diagnosis device that diagnoses deterioration of a catalyst disposed on an exhaust side of a combustion device includes: a unit configured to obtain a temperature of the catalyst; a unit configured to obtain a first sensor output from a first gas sensor disposed between the combustion device and the catalyst; a unit configured to obtain a second sensor output from a second gas sensor disposed between the catalyst and an exhaust port; and a unit configured to determine the catalyst to be faulty when a conversion efficiency obtained with the first sensor output and the second sensor output at a preset evaluative catalyst temperature is equal to or less than a preset evaluative conversion efficiency.

According to a fifth aspect of the present invention, a catalyst deterioration diagnosis method includes: obtaining a temperature of a catalyst disposed between a combustion device and an exhaust port; obtaining a sensor output from a gas sensor disposed between the catalyst and the exhaust port; and determining the catalyst to be faulty when the temperature of the catalyst obtained when the sensor output becomes a preset evaluative output is equal to or higher than a preset evaluative catalyst temperature.

According to a sixth aspect of the present invention, a catalyst deterioration diagnosis method includes: obtaining a temperature of a catalyst disposed between a combustion device and an exhaust port; obtaining a sensor output from a gas sensor disposed between the catalyst and the exhaust port; and determining the catalyst to be faulty when the sensor output obtained when the temperature of the catalyst becomes a preset evaluative catalyst temperature is equal to or greater than a preset evaluative output.

According to a seventh aspect of the present invention, a catalyst deterioration diagnosis method includes: obtaining a temperature of a catalyst disposed between a combustion device and an exhaust port; obtaining a first sensor output from a first gas sensor disposed between the combustion device and the catalyst; obtaining a second sensor output from a second gas sensor disposed between the catalyst and the exhaust port; and determining the catalyst to be faulty when the temperature of the catalyst at a time when a conversion efficiency obtained with the first sensor output and the second sensor output becomes a preset evaluative conversion efficiency is equal to or higher than a preset evaluative catalyst temperature.

According to an eighth aspect of the present invention, a catalyst deterioration diagnosis method includes: obtaining a temperature of a catalyst disposed between a combustion device and an exhaust port: obtaining a first sensor output from a first gas sensor disposed between the combustion device and the catalyst; obtaining a second sensor output from a second gas sensor disposed between the catalyst and the exhaust port; and determining the catalyst to be faulty when a conversion efficiency obtained with the first sensor output and the second sensor output at a preset evaluative catalyst temperature is equal to or less than a preset evaluative conversion efficiency.

The catalyst deterioration diagnosis device and the catalyst deterioration diagnosis method of the invention can solve problems of fault detection utilizing OSC (Oxygen Storage Capacity), can perform catalyst deterioration diagnosis very precisely in a short time, and are suitable also for on-board fault diagnostics.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 12 is a flowchart showing a processing operation (a fourth catalyst deterioration diagnosis method) of the fourth catalyst deterioration diagnosis device.

DESCRIPTION OF THE PREFERRED EMBODIMENTS

Embodiments of the catalyst deterioration diagnosis device and the catalyst deterioration diagnosis method according to the present invention will now be described referring to FIGS. 1 to 12. In this specification, the word "to" used to indicate a numerical range means that the range includes the numerical values before and after that as lower and upper limits.

Figure 1:
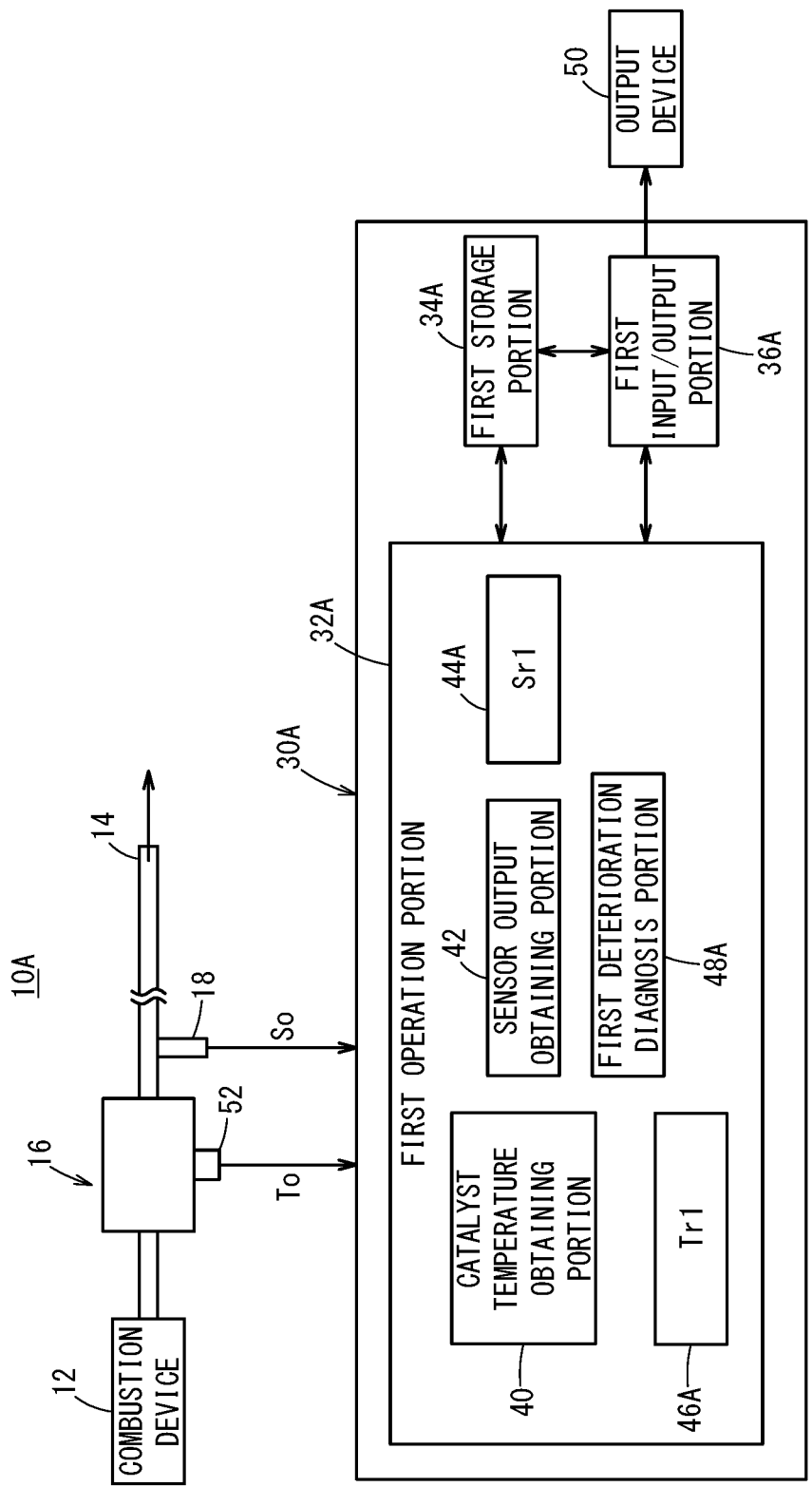
FIG. 1 is a block diagram showing the configuration of a catalyst deterioration diagnosis device (a first catalyst deterioration diagnosis device) according to a first embodiment.

First, as shown in FIG. 1, a catalyst deterioration diagnosis device (hereinafter referred to as a first catalyst deterioration diagnosis device 10A) according to a first embodiment diagnoses deterioration of a catalyst (catalytic converter) 16 disposed on the exhaust side of a combustion device 12, i.e. between the combustion device 12 and an exhaust port 14.

The first catalyst deterioration diagnosis device 10A performs a deterioration diagnosis of the catalyst 16, i.e. determines whether the catalyst 16 is normal or faulty, on the basis of a catalyst temperature that is obtained when a preset sensor output value is output from a gas sensor 18.

The combustion device 12 can be a car engine, gasoline engine, diesel engine, etc., for example. The catalyst 16 can be a three-way catalyst etc., for example.

The gas sensor 18 is disposed between the catalyst 16 and the exhaust port 14. The gas sensor 18 can be a NOx sensor or HC sensor, for example.

As shown in FIG. 1, the first catalyst deterioration diagnosis device 10A includes a first CPU (Central Processing Unit) 30A.

The first CPU 30A includes a first operation portion 32A, a first storage portion 34A, and a first input/output portion 36A. The first operation portion 32A includes a catalyst temperature obtaining portion 40, a sensor output obtaining portion 42, a first evaluative output storing portion 44A (indicated as "Sr1" in FIG. 1), a first evaluative catalyst temperature storing portion 46A (indicated as "Tr1" in FIG. 1), and a first deterioration diagnosis portion 48A. The result of diagnosis from the first deterioration diagnosis portion 48A is output through the first input/output portion 36A to an output device 50 such as a deterioration indication light flag. For example, the result of diagnosis is processed in the engine ECU by integration of the number of times, or frequency, that the deterioration flag is set. When a final diagnosis indicating a fault has been made, the driver is alerted by illumination of a malfunction indicator lamp through the deterioration indication light flag. As a matter of course, the output device 50 can be a display device, a portable information terminal, or the like, for example.

That is, the first operation portion 32A executes programs stored in the first storage portion 34A to function as the catalyst temperature obtaining portion 40, the sensor output obtaining portion 42, the first evaluative output storing portion 44A, the first evaluative catalyst temperature storing portion 46A, and the first deterioration diagnosis portion 48A.

The catalyst temperature obtaining portion 40 obtains a temperature To of the catalyst 16 (hereinafter referred to as "catalyst temperature To") based on a signal from a thermometer 52 provided directly to the catalyst 16, or a thermometer 52 provided near the catalyst 16. Alternatively, the catalyst temperature To can be an estimated catalyst temperature that is calculated from accumulated applied heat, accumulated air amount, etc. This applies also to the embodiments described later.

The sensor output obtaining portion 42 obtains a sensor output So from the gas sensor 18 disposed between the catalyst 16 and the exhaust port 14.

The first evaluative output storing portion 44A stores a first evaluative output Sr1. This first evaluative output Sr1 can be, for example, a value obtained by multiplying a NOx concentration directly output from the combustion device 12 by a conversion efficiency.

Figure 2:
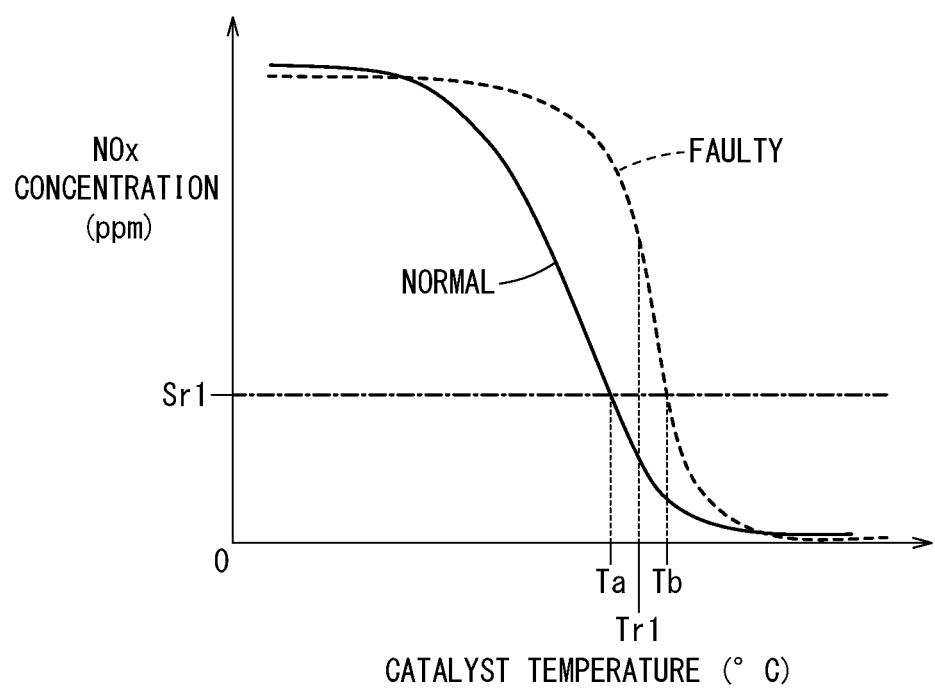
FIG. 2 is a characteristic diagram showing a method for setting an evaluative catalyst temperature based on characteristics between catalyst temperature and NOx concentration of a normal catalyst and a faulty catalyst.

The first evaluative catalyst temperature storing portion 46A stores a first evaluative catalyst temperature Tr1. This first evaluative catalyst temperature Tr1 can be set as below. That is, in advance, by using a normal catalyst 16, a catalyst temperature at the time when the sensor output So (NOx concentration) has reached the preset first evaluative output Sr1 is obtained as a catalyst temperature Ta as shown in FIG. 2. Similarly, by using a faulty catalyst 16, a catalyst temperature at the time when the sensor output So has reached the preset first evaluative output Sr1 is obtained as a catalyst temperature Tb. Then, the first evaluative catalyst temperature Tr1 is set within the range of Ta<Tr1<Tb and stored in the first evaluative catalyst temperature storing portion 46A.

The first evaluative catalyst temperature Tr1 may be previously determined to be a temperature corresponding to a middle point between the temperatures Ta and Tb, or may be set in the range between the temperatures Ta and Tb according to the type of the combustion device 12 (the number of cylinders, etc.) or the kind of the catalyst 16, for example. Further, the first evaluative catalyst temperature Tr1 may be set in accordance with the amount of air contained in the exhaust from the combustion device 12, i.e. the amount of air fed to the catalyst 16. For example, the first evaluative catalyst temperature Tr1 is raised as the amount of air increases, and the first evaluative catalyst temperature Tr1 is lowered as the amount of air decreases. Assuming a vehicle, for example, the amount of air may be the amount of intake air obtained by an airflow meter (AFM), or may be set based on an intake air amount map indicating a relation among the accelerator opening, the engine speed, and the amount of intake air. The same applies to the embodiments described below.

The first deterioration diagnosis portion 48A determines that the catalyst 16 is faulty when the catalyst temperature To at the time when the sensor output So obtained by the sensor output obtaining portion 42 has reached the preset first evaluative output Sr1 is equal to or higher than the preset first evaluative catalyst temperature Tr1.

Next, the processing operation of the first catalyst deterioration diagnosis device 10A (a first catalyst deterioration diagnosis method) will be described based on the flowchart of FIG. 3.

Figure 3:
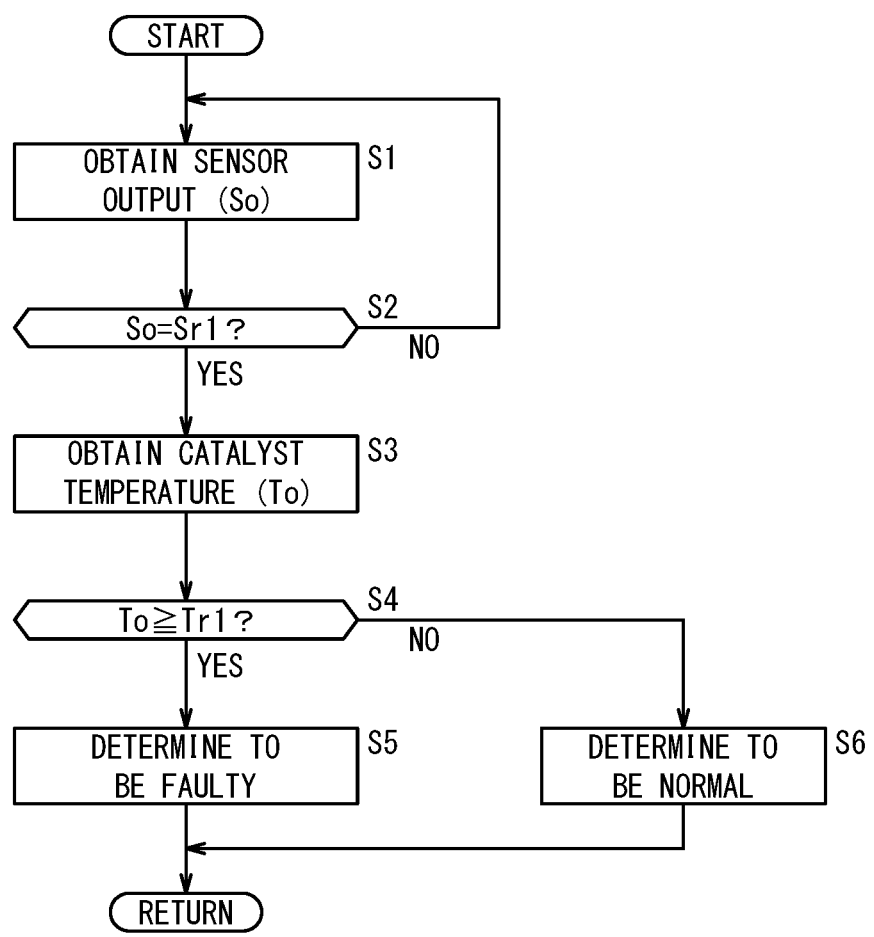
FIG. 3 is a flowchart showing a processing operation (a first catalyst deterioration diagnosis method) of the first catalyst deterioration diagnosis device.

First, at step S1 of FIG. 3, the sensor output obtaining portion 42 obtains the sensor output So from the gas sensor 18.

At step S2, the first deterioration diagnosis portion 48A determines whether the sensor output So is equal to the first evaluative output Sr1. The sensor output So and the first evaluative output Sr1 are determined to be equal if the difference is within an error range (e.g. 1 ppm or less). If the two are not equal, the processing at and after step S1 is repeated.

If the sensor output So is equal to the first evaluative output Sr1, then the process proceeds to step S3, where the catalyst temperature obtaining portion 40 obtains the catalyst temperature To.

At step S4, the first deterioration diagnosis portion 48A determines whether the obtained temperature To of the catalyst 16 is not less than the previously stored first evaluative catalyst temperature Tr1. If it is equal to or higher than the first evaluative catalyst temperature Tr1, the process proceeds to next step S5, where the first deterioration diagnosis portion 48A determines that the catalyst 16 is faulty.

If it is determined that the temperature To of the catalyst 16 is less than the first evaluative catalyst temperature Tr1 at step S4, the process proceeds to step S6, where the first deterioration diagnosis portion 48A determines that the catalyst 16 is normal.

In this way, the first catalyst deterioration diagnosis device 10A and the first catalyst deterioration diagnosis method obtain the temperature To of the catalyst 16 disposed between the combustion device 12 and the exhaust port 14, and obtain the sensor output So from the gas sensor 18 disposed between the catalyst 16 and the exhaust port 14. Then, the catalyst 16 is determined to be faulty if the catalyst temperature To that is obtained when the sensor output So has reached the preset first evaluative output Sr1 is equal to or higher than the preset first evaluative catalyst temperature Tr1.

When the gas sensor 18 is a NOx sensor, for example, the evaluative output may be obtained by multiplying a NOx concentration directly output from the combustion device 12 by a conversion efficiency.

The first evaluative catalyst temperature Tr1 is determined such that Ta<Tr1<Tb, where Ta is the catalyst temperature To obtained when the sensor output So with a normal catalyst 16 becomes the preset first evaluative output Sr1, and Tb is the catalyst temperature To obtained when the sensor output So with a faulty catalyst 16 becomes the preset first evaluative output Sr1.

Then, the catalyst 16 is determined to be faulty when the temperature To of the catalyst 16 that is obtained when the sensor output So has reached the preset first evaluative output Sr1 is equal to or higher than the preset first evaluative catalyst temperature Tr1.

The deterioration diagnosis method can solve various problems of the fault detection that utilizes OSC (Oxygen Storage Capacity) mentioned earlier, can highly accurately implement the deterioration diagnosis of the catalyst 16 in a short time, and is suitable also for on-board fault diagnostics. Especially, the search for So=Sr1 at steps S1 to S2 of FIG. 3 takes a shorter time (about 1 second) than the time required for the step of switching between lean and rich by OSC. Furthermore, the processing at and after step S3 is almost all performed on the CPU and so the processing time is extremely short, less than only about 1 second. Accordingly, whether the catalyst 16 is faulty or normal can be detected in about 1 second.

Furthermore, the accuracy of the fault detection can be further improved by setting the first evaluative catalyst temperature Tr1 according to the amount of air fed to the catalyst 16.

Next, a catalyst deterioration diagnosis device according to a second embodiment (hereinafter referred to as a second catalyst deterioration diagnosis device 10B) will be described referring to FIGS. 4 to 6.

The second catalyst deterioration diagnosis device 10B performs a deterioration diagnosis of the catalyst 16, i.e. determines whether the catalyst 16 is normal or faulty, on the basis of an output of the gas sensor 18 at a preset catalyst temperature.

Figure 4:
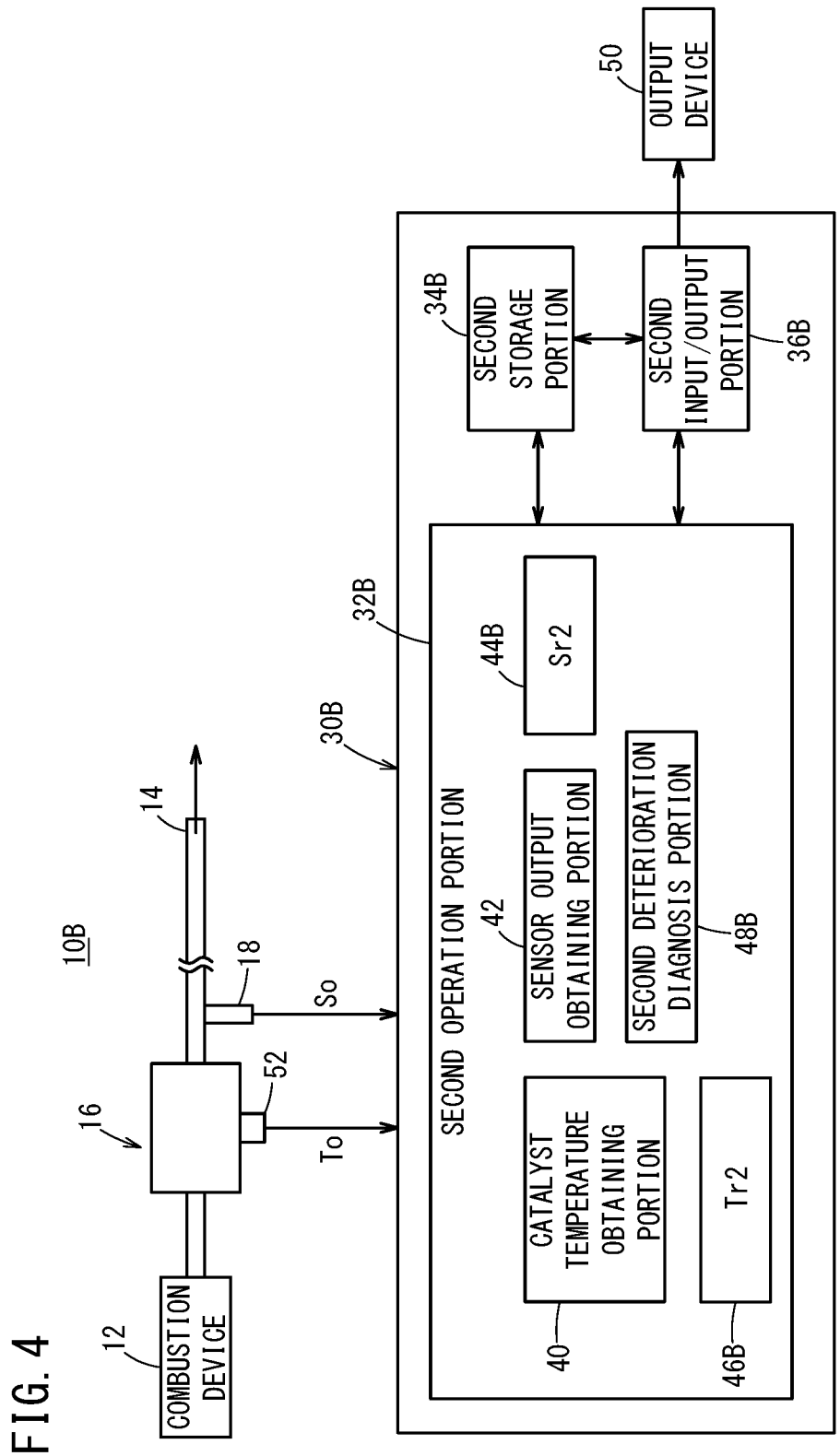
FIG. 4 is a block diagram showing the configuration of a catalyst deterioration diagnosis device (a second catalyst deterioration diagnosis device) according to a second embodiment.
Figure 5:
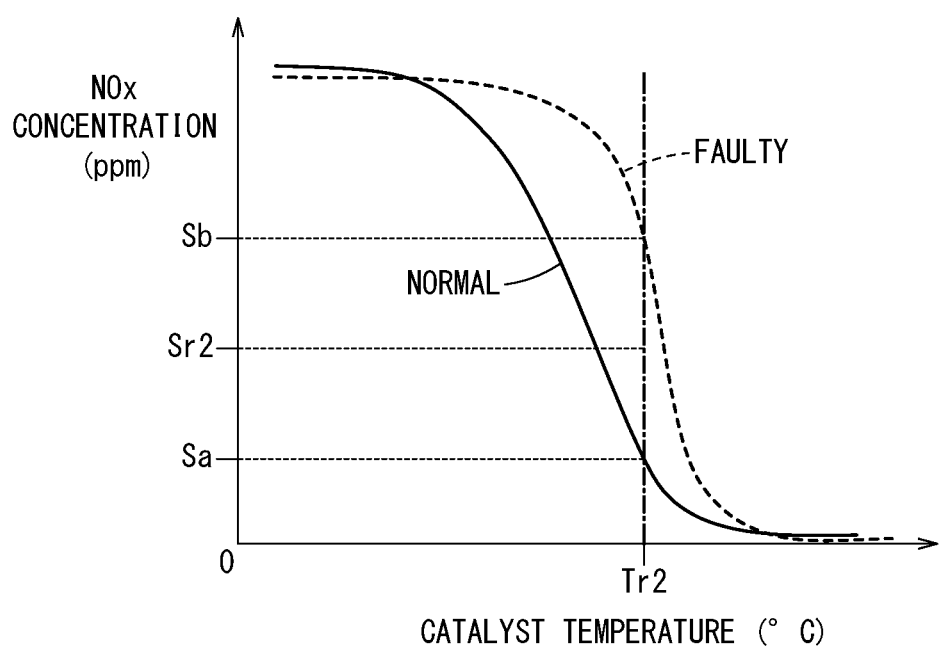
FIG. 5 is a characteristic diagram showing a method for setting an evaluative output based on characteristics between catalyst temperature and NOx concentration of a normal catalyst and a faulty catalyst.

As shown in FIG. 4, the second catalyst deterioration diagnosis device 10B includes a second CPU 30B. The second CPU 30B includes a second operation portion 32B, a second storage portion 34B, and a second input/output portion 36B. The second operation portion 32B includes a catalyst temperature obtaining portion 40, a sensor output obtaining portion 42, a second evaluative output storing portion 44B (indicated as "Sr2" in FIG. 4), a second evaluative catalyst temperature storing portion 46B (indicated as "Tr2" in FIG. 4), and a second deterioration diagnosis portion 48B.

That is, the second operation portion 32B executes programs stored in the second storage portion 34B to function as the catalyst temperature obtaining portion 40, the sensor output obtaining portion 42, the second evaluative output storing portion 44B, the second evaluative catalyst temperature storing portion 46B, and the second deterioration diagnosis portion 48B.

The catalyst temperature obtaining portion 40 and the sensor output obtaining portion 42 are not described in detail here since they have already been described before.

The second evaluative catalyst temperature storing portion 46B stores a given second evaluative catalyst temperature Tr2 (e.g. 150° C.).

The second evaluative output storing portion 44B stores a second evaluative output Sr2. This second evaluative output Sr2 can be set as below. As shown in FIG. 5, in advance, by using a normal catalyst 16, a sensor output at the time when the catalyst temperature To has reached the preset second evaluative catalyst temperature Tr2 is obtained as a sensor output Sa, and, by using a faulty catalyst 16, a sensor output at the time when the catalyst temperature To has reached the preset second evaluative catalyst temperature Tr2 is obtained as a sensor output Sb. Then, the second evaluative output Sr2 is set such that Sa<Sr2<Sb.

The second evaluative output Sr2 may be previously determined to be an output corresponding to a middle point between the sensor outputs Sa and Sb, or may be set in the range between the sensor outputs Sa and Sb according to the type of the combustion device 12 (the number of cylinders, etc.) or the kind of the catalyst 16, for example. Further, the second evaluative output Sr2 may be set in accordance with the amount of air contained in the exhaust from the combustion device 12, i.e. the amount of air fed to the catalyst 16. For example, the second evaluative output Sr2 is raised as the amount of air increases, and the second evaluative output Sr2 is lowered as the amount of air decreases.

The second deterioration diagnosis portion 48B determines that the catalyst 16 is faulty when the sensor output So obtained when the catalyst temperature To obtained by the catalyst temperature obtaining portion 40 has reached the preset second evaluative catalyst temperature Tr2 is equal to or greater than the preset second evaluative output Sr2.

Next, processing of the second catalyst deterioration diagnosis device 10B (a second catalyst deterioration diagnosis method) will be described based on the flowchart of FIG. 6.

Figure 6:
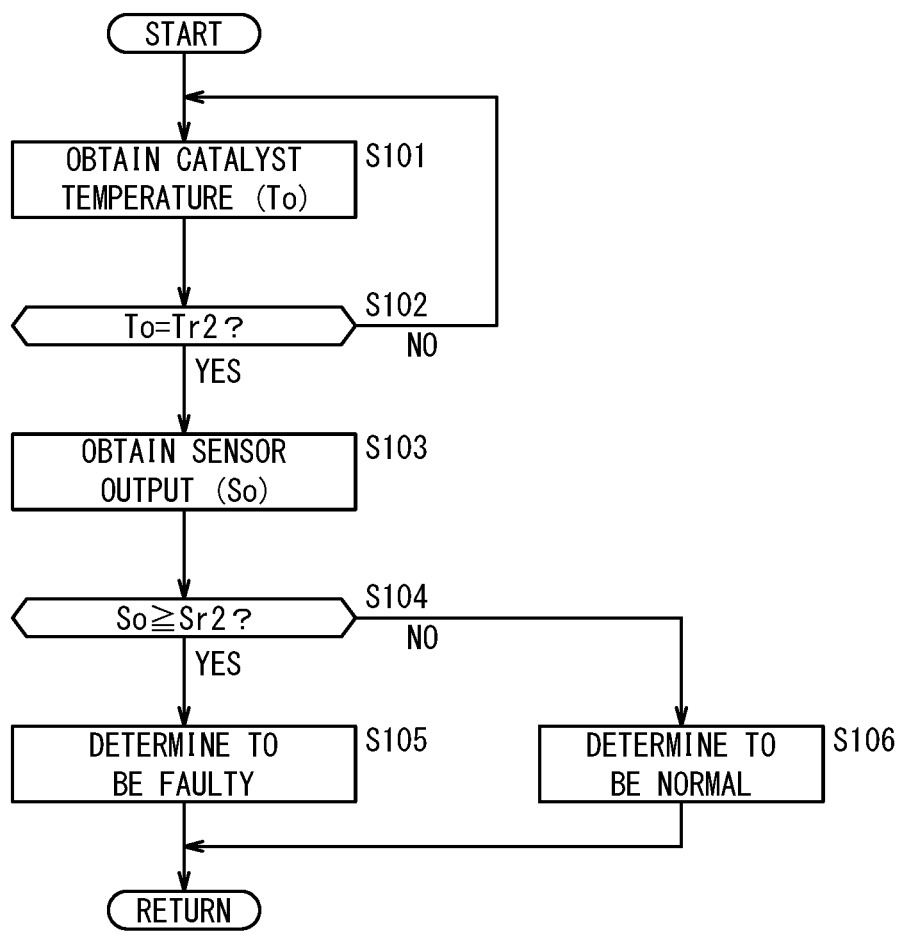
FIG. 6 is a flowchart showing a processing operation (a second catalyst deterioration diagnosis method) of the second catalyst deterioration diagnosis device.

First, at step S101 of FIG. 6, the catalyst temperature obtaining portion 40 obtains the temperature To of the catalyst 16.

At step S102, the second deterioration diagnosis portion 48B determines whether the obtained catalyst temperature To is equal to the second evaluative catalyst temperature Tr2. The catalyst temperature To and the second evaluative catalyst temperature Tr2 are determined to be equal if the difference is within an error range (e.g. 5° C. or less). If the two are not equal, the processing at and after step S101 is repeated.

If the obtained catalyst temperature To is equal to the second evaluative catalyst temperature Tr2, then the process proceeds to step S103, where the sensor output obtaining portion 42 obtains the sensor output So from the gas sensor 18.

At step S104, the second deterioration diagnosis portion 48B determines whether the obtained sensor output So is not less than the previously stored second evaluative output Sr2. If it is equal to or greater than the second evaluative output Sr2, then the process proceeds to next step S105, where the second deterioration diagnosis portion 48B determines that the catalyst 16 is faulty.

If step S104 determines that the obtained sensor output So is less than the previously stored second evaluative output Sr2, then the process proceeds to step S106, where the second deterioration diagnosis portion 48B determines that the catalyst 16 is normal.

In this way, the second catalyst deterioration diagnosis device 10B and the second catalyst deterioration diagnosis method obtain the temperature To of the catalyst 16 disposed between the combustion device 12 and the exhaust port 14, and obtain the sensor output from the gas sensor 18 disposed between the catalyst 16 and the exhaust port 14. Then, the catalyst 16 is determined to be faulty if the sensor output So at the time when the temperature To of the catalyst 16 has reached the preset second evaluative catalyst temperature Tr2 is equal to or greater than the preset second evaluative output Sr2.

For example, when the gas sensor 18 is a NOx sensor and the second evaluative catalyst temperature Tr2 is 150° C., the second evaluative output Sr2 is determined such that Sa<Sr2<Sb, where Sa is the sensor output at the time when the temperature To of the catalyst 16 is 150° C. with a normal catalyst 16, and Sb is the sensor output at the time when the catalyst temperature To is 150° C. with a faulty catalyst 16.

Then, the catalyst 16 is determined to be faulty when the sensor output So that is obtained when the temperature To of the catalyst 16 has reached the preset second evaluative catalyst temperature Tr2 is equal to or greater than the preset second evaluative output Sr2.

The deterioration diagnosis method can solve problems of the fault detection that utilizes OSC, can highly accurately implement the deterioration diagnosis of the catalyst 16 in a short time, and is suitable also for on-board fault diagnostics. Especially, the search for To=Tr2 at steps S101 to S102 takes a shorter time (about 1 second) than the time required for the step of switching between lean and rich by OSC. Furthermore, the processing at and after step S103 is almost all performed on the CPU and so the processing time is extremely short, less than only about 1 second. Accordingly, whether the catalyst 16 is faulty or normal can be detected in about 1 second.

Furthermore, the accuracy of the fault detection can be further improved by setting the second evaluative output Sr2 according to the amount of air fed to the catalyst 16.

Figure 7:
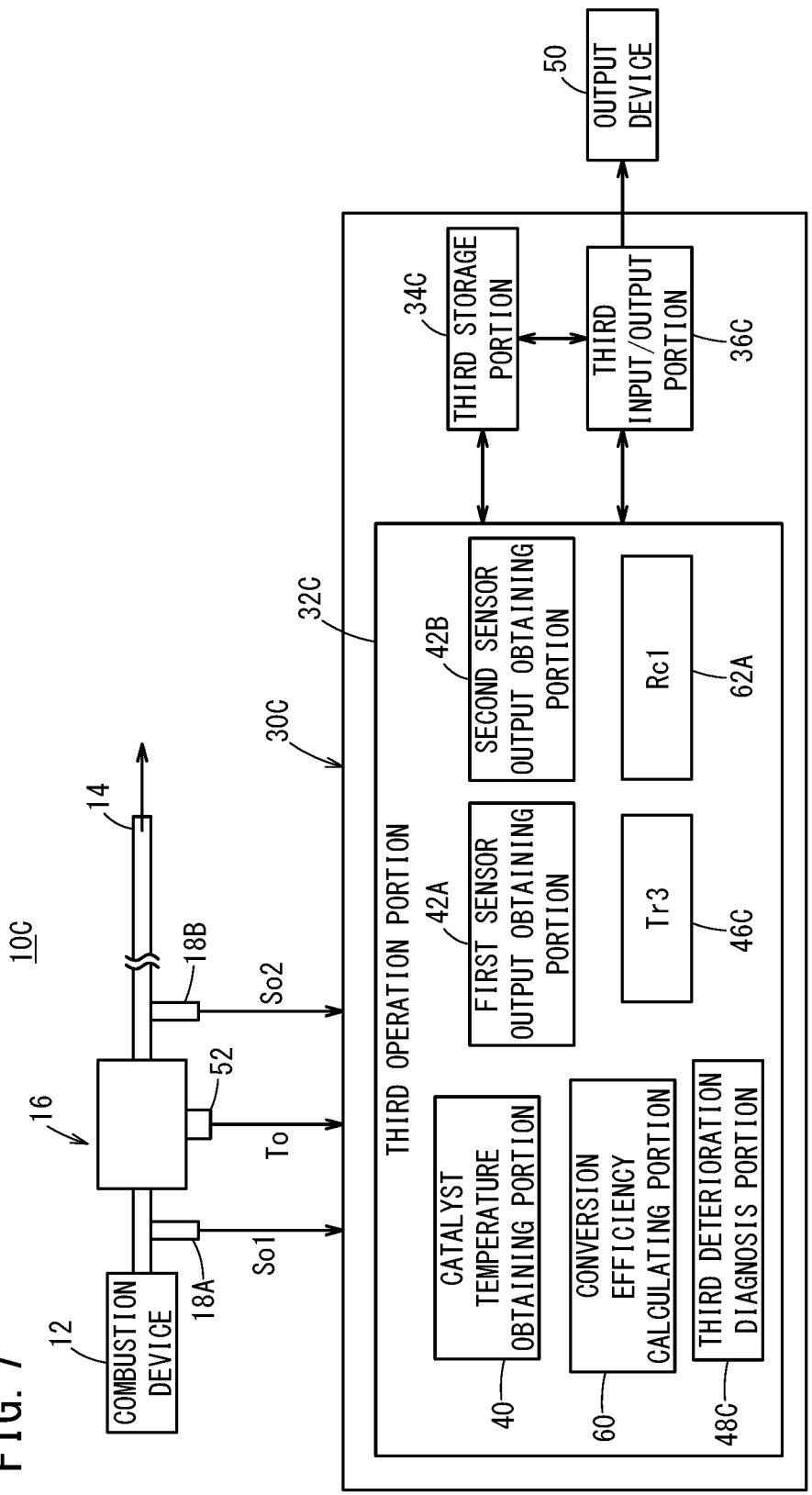
FIG. 7 is a block diagram showing the configuration of a catalyst deterioration diagnosis device (a third catalyst deterioration diagnosis device) according to a third embodiment.

Next, a catalyst deterioration diagnosis device according to a third embodiment (hereinafter referred to as a third catalyst deterioration diagnosis device 10C) has a similar configuration to those of the above-described first catalyst deterioration diagnosis device 10A and second catalyst deterioration diagnosis device 10B. However, as shown in FIG. 7, the third catalyst deterioration diagnosis device 10C is different from the first and second catalyst deterioration diagnosis devices 10A and 10B in that it includes a first gas sensor 18A disposed between the combustion device 12 and the catalyst 16 and a second gas sensor 18B disposed between the catalyst 16 and the exhaust port 14. The first gas sensor 18A and the second gas sensor 18B may each be formed of a NOx sensor or HC sensor, for example.

The third catalyst deterioration diagnosis device 10C performs a deterioration diagnosis of the catalyst 16, i.e. determines whether the catalyst 16 is normal or faulty, on the basis of a catalyst temperature To obtained when a preset conversion efficiency has been achieved based on the first gas sensor 18A and the second gas sensor 18B.

As shown in FIG. 7, the third catalyst deterioration diagnosis device 10C includes a third CPU 30C. The third CPU 30C includes a third operation portion 32C, a third storage portion 34C, and a third input/output portion 36C. The third operation portion 32C includes a catalyst temperature obtaining portion 40, a first sensor output obtaining portion 42A, a second sensor output obtaining portion 42B, a conversion efficiency calculating portion 60, a third evaluative catalyst temperature storing portion 46C (indicated as "Tr3" in FIG. 7), a first evaluative conversion efficiency storing portion 62A (indicated as "Rc1" in FIG. 7), and a third deterioration diagnosis portion 48C.

That is, the third operation portion 32C executes programs stored in the third storage portion 34C to function as the catalyst temperature obtaining portion 40, the first sensor output obtaining portion 42A, the second sensor output obtaining portion 42B, the conversion efficiency calculating portion 60, the third evaluative catalyst temperature storing portion 46C, the first evaluative conversion efficiency storing portion 62A, and the third deterioration diagnosis portion 48C. The catalyst temperature obtaining portion 40 is not described here in detail because it has already been explained above.

The first sensor output obtaining portion 42A obtains a first sensor output So1 (ppm) from the first gas sensor 18A disposed between the combustion device 12 and the catalyst 16. The second sensor output obtaining portion 42B obtains a second sensor output So2 (ppm) from the second gas sensor 18B disposed between the catalyst 16 and the exhaust port 14.

The conversion efficiency calculating portion 60 calculates the conversion efficiency according to the expression below.

$$\text{Conversion efficiency} = \{1-(So2/So1)\} \times 100(\%)$$

The first evaluative conversion efficiency storing portion 62A stores 50% as the first evaluative conversion efficiency Rc1, for example.

Figure 8:
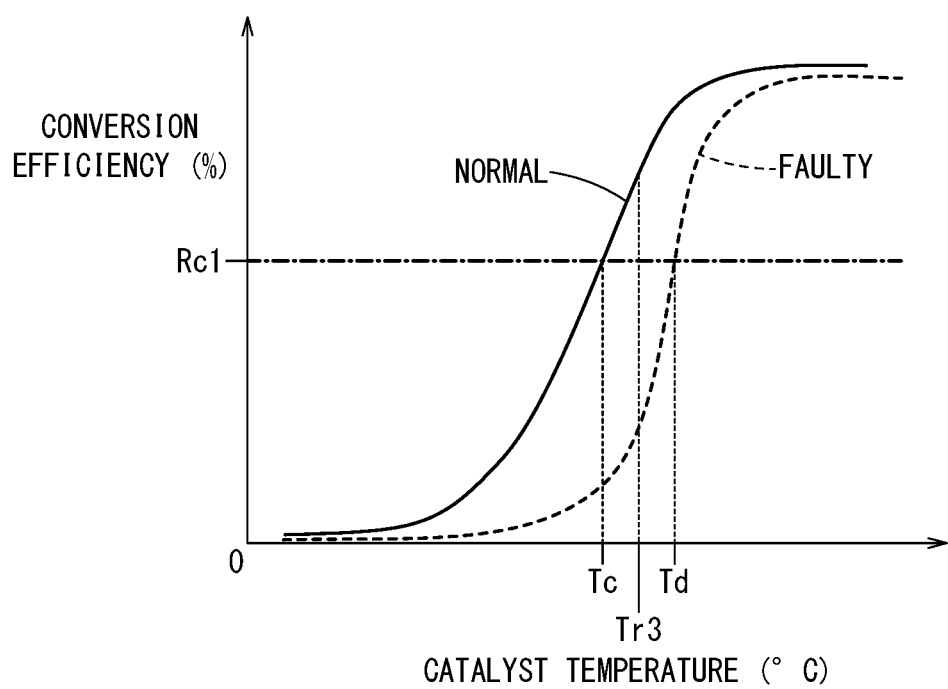
FIG. 8 is a characteristic diagram showing a method for setting an evaluative catalyst temperature based on characteristics between catalyst temperature and conversion efficiency of a normal catalyst and a faulty catalyst.

The third evaluative catalyst temperature storing portion 46C stores a third evaluative catalyst temperature Tr3. This third evaluative catalyst temperature Tr3 can be set as below. As shown in FIG. 8, in advance, by using a normal catalyst 16, a catalyst temperature at the time when the conversion efficiency obtained using the first gas sensor 18A and the second gas sensor 18B has reached the preset first evaluative conversion efficiency Rc1 is obtained as a catalyst temperature Tc, and, by using a faulty catalyst 16, a catalyst temperature at the time when the conversion efficiency obtained using the first gas sensor 18A and the second gas sensor 18B has reached the preset first evaluative conversion efficiency Rc1 is obtained as a catalyst temperature Td. Then, the third evaluative catalyst temperature Tr3 is set such that Tc<Tr3<Td.

The third evaluative catalyst temperature Tr3 may be previously determined to be a temperature corresponding to a middle point between the temperatures Tc and Td, or may be set in the range between the temperatures Tc and Td according to the type of the combustion device 12 (the number of cylinders, etc.) or the kind of the catalyst 16, for example. Further, the third evaluative catalyst temperature Tr3 may be set in accordance with the amount of air contained in the exhaust from the combustion device 12, i.e. the amount of air fed to the catalyst 16. For example, the third evaluative catalyst temperature Tr3 is raised as the amount of air increases, and the third evaluative catalyst temperature Tr3 is lowered as the amount of air decreases.

The third deterioration diagnosis portion 48C determines that the catalyst 16 is faulty when the temperature To of the catalyst 16 at the time when the conversion efficiency obtained with the first sensor output So1 obtained by the first sensor output obtaining portion 42A and the second sensor output So2 obtained by the second sensor output obtaining portion 42B has reached the preset first evaluative conversion efficiency Rc1 is equal to or higher than the preset third evaluative catalyst temperature Tr3.

Figure 9:
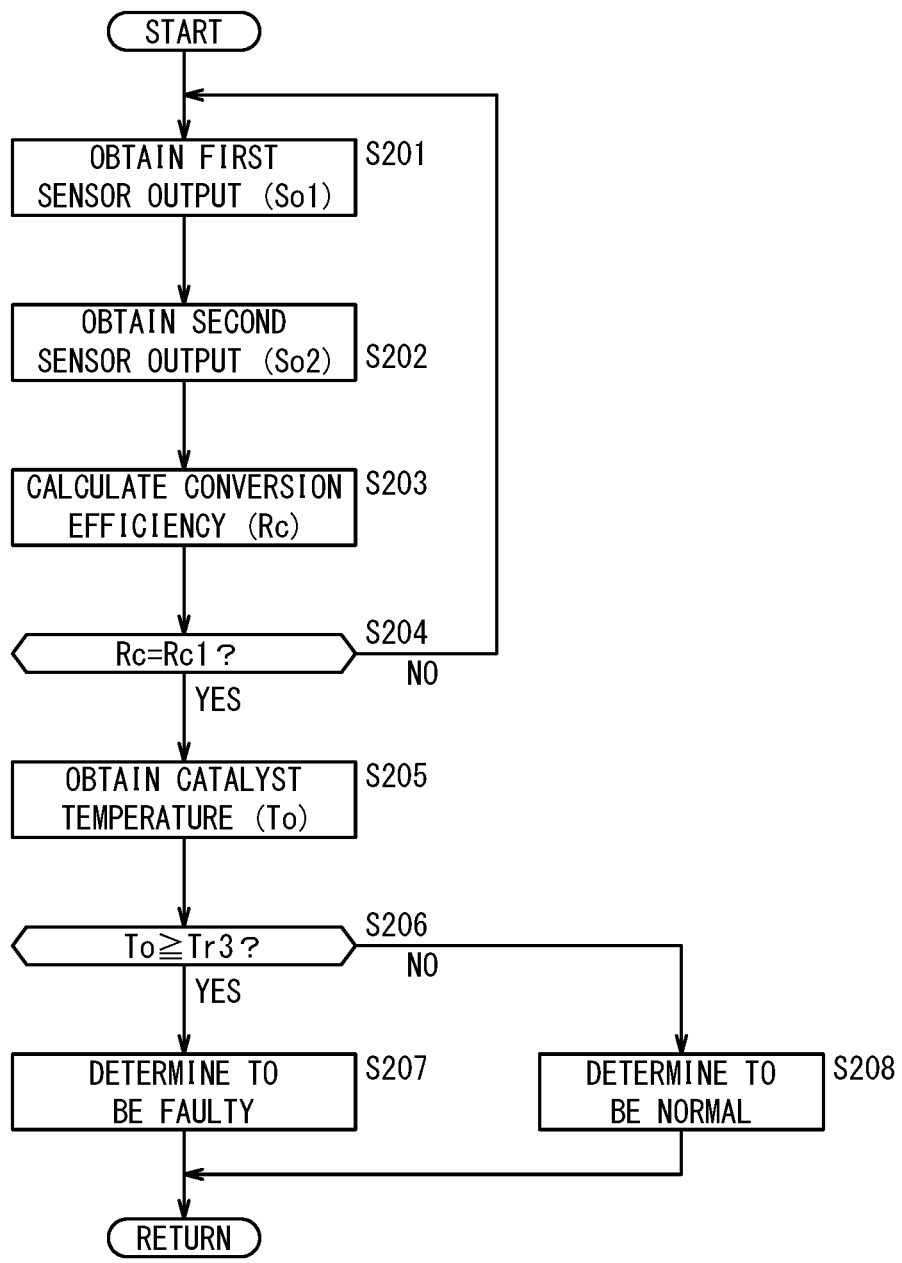
FIG. 9 is a flowchart showing a processing operation (a third catalyst deterioration diagnosis method) of the third catalyst deterioration diagnosis device.

Next, processing of the third catalyst deterioration diagnosis device 10C (a third catalyst deterioration diagnosis method) will be described based on the flowchart of FIG. 9.

First, at step S201, the first sensor output obtaining portion 42A obtains the first sensor output So1 from the first gas sensor 18A.

At step S202, the second sensor output obtaining portion 42B obtains the second sensor output So2 from the second gas sensor 18B.

At step S203, the conversion efficiency calculating portion 60 calculates a conversion efficiency Rc based on the obtained first sensor output So1 and second sensor output So2.

At step S204, the third deterioration diagnosis portion 48C determines whether the calculated conversion efficiency Rc is equal to the first evaluative conversion efficiency Rc1. The conversion efficiency Rc and the first evaluative conversion efficiency Rc1 are determined to be equal if the difference is within an error range (e.g. 1% or less). If the two are not equal, the processing at and after step S201 is repeated.

If the conversion efficiency Rc is equal to the first evaluative conversion efficiency Rc1, then the process proceeds to step S205, where the catalyst temperature obtaining portion 40 obtains the temperature To of the catalyst 16.

At step S206, the third deterioration diagnosis portion 48C determines whether the obtained temperature To of the catalyst 16 is not less than the previously stored third evaluative catalyst temperature Tr3. If it is equal to or higher than the third evaluative catalyst temperature Tr3, then the process proceeds to next step S207, where the third deterioration diagnosis portion 48C determines that the catalyst 16 is faulty.

If it is determined that the temperature To of the catalyst 16 is less than the third evaluative catalyst temperature Tr3 at step S206, then the process proceeds to step S208, where the third deterioration diagnosis portion 48C determines that the catalyst 16 is normal.

In this way, the third catalyst deterioration diagnosis device 10C (the third catalyst deterioration diagnosis method) obtains the temperature To of the catalyst 16 disposed between the combustion device 12 and the exhaust port 14, obtains the first sensor output So1 from the first gas sensor 18A disposed between the combustion device 12 and the catalyst 16, and obtains the second sensor output So2 from the second gas sensor 18B disposed between the catalyst 16 and the exhaust port 14. Then, the catalyst 16 is determined to be faulty if the temperature To of the catalyst 16 at the time when the conversion efficiency Rc obtained with the first sensor output So1 and the second sensor output So2 has reached the preset first evaluative conversion efficiency Rc1 is equal to or higher than the preset third evaluative catalyst temperature Tr3.

For example, it is assumed that the first gas sensor 18A and the second gas sensor 18B are each a NOx sensor and the first evaluative conversion efficiency Rc1 is 50%. Also, by using a normal catalyst 16, a catalyst temperature at the time when the conversion efficiency Rc obtained with the first sensor output So1 and the second sensor output So2 has reached 50% is obtained as a catalyst temperature Tc. Further, by using a faulty catalyst 16, a catalyst temperature at the time when the conversion efficiency Rc obtained with the first sensor output So1 and the second sensor output So2 has reached 50% is obtained as a catalyst temperature Td. Then, the third evaluative catalyst temperature Tr3 is determined such that Tc<Tr3<Td.

Then, the catalyst 16 is determined to be faulty if the temperature To of the catalyst 16 at the time when the conversion efficiency Rc obtained with the first sensor output So1 and the second sensor output So2 has reached the preset first evaluative conversion efficiency Rc1 is equal to or higher than the preset third evaluative catalyst temperature Tr3.

The deterioration diagnosis method can solve various problems of the fault detection that utilizes OSC (Oxygen Storage Capacity) described earlier, can highly accurately implement the deterioration diagnosis of the catalyst 16 in a short time, and is suitable also for on-board fault diagnostics. Especially, the search for Rc=Rc1 at steps S201 to S204 takes a shorter time (about 1 second) than the time required for the step of switching between lean and rich by OSC. Furthermore, the processing at and after step S205 is performed on the CPU and so the processing time is extremely short, only about 1 second. Accordingly, whether the catalyst 16 is faulty or normal can be detected in about 1 second.

Furthermore, the accuracy of the fault detection can be further improved by setting the third evaluative catalyst temperature Tr3 according to the amount of air fed to the catalyst 16.

Next, a catalyst deterioration diagnosis device according to a fourth embodiment (hereinafter referred to as a fourth catalyst deterioration diagnosis device 10D) will be described referring to FIGS. 10 to 12.

The fourth catalyst deterioration diagnosis device 10D performs a deterioration diagnosis of the catalyst 16, i.e. determines whether the catalyst 16 is normal or faulty, on the basis of a conversion efficiency obtained at a preset catalyst temperature (e.g. 150° C.) using the first gas sensor 18A and second gas sensor 18B.

Figure 10:
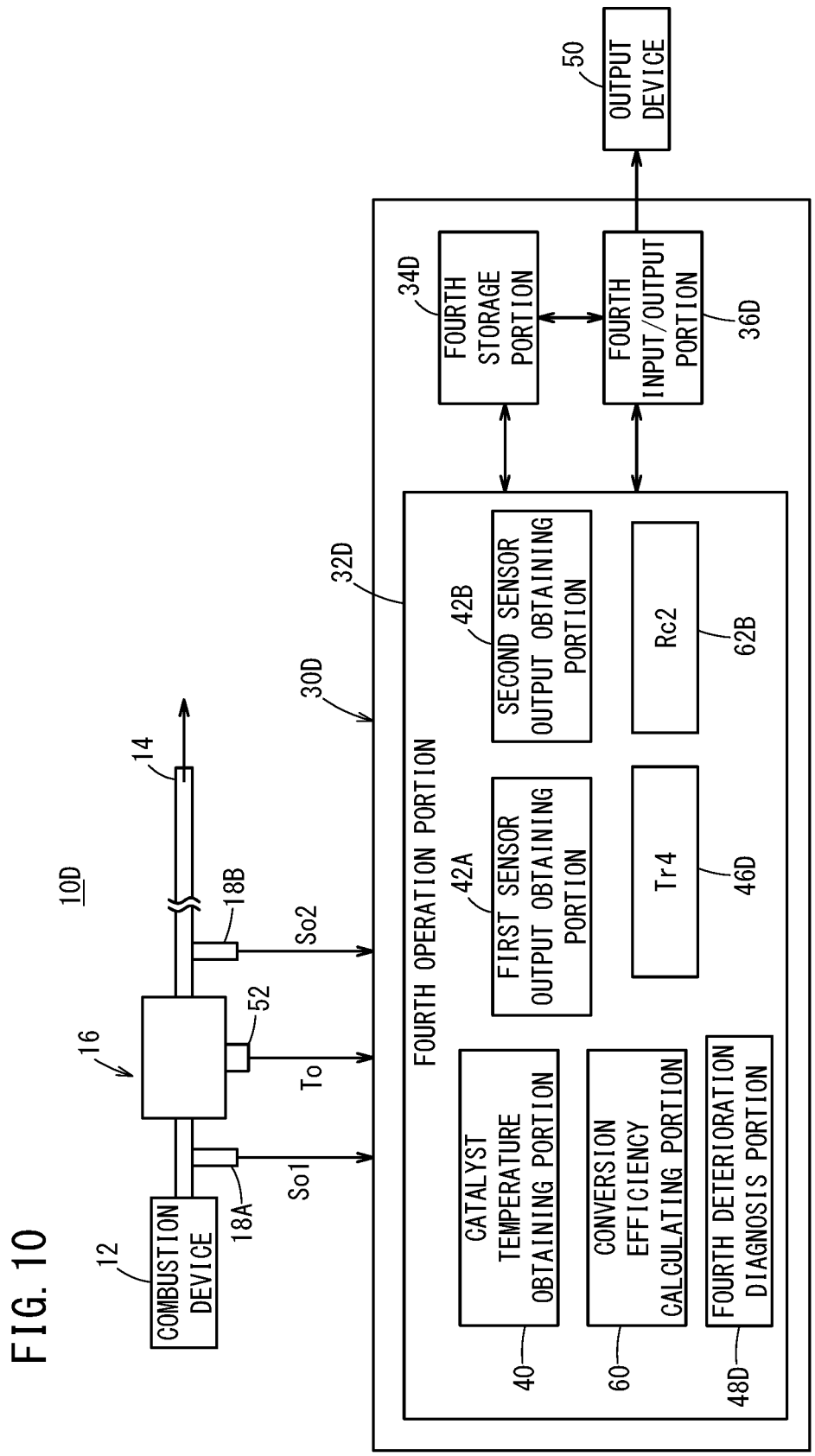
FIG. 10 is a block diagram showing the configuration of a catalyst deterioration diagnosis device (a fourth catalyst deterioration diagnosis device) according to a fourth embodiment.
Figure 11:
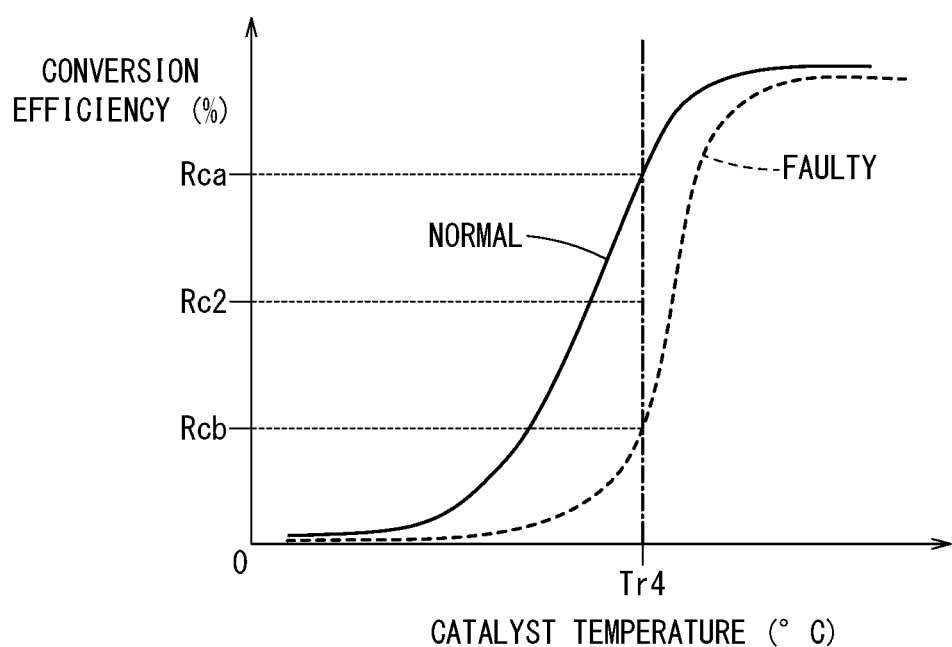
FIG. 11 is a characteristic diagram showing a method for setting an evaluative conversion efficiency based on characteristics between catalyst temperature and conversion efficiency of a normal catalyst and a faulty catalyst.

As shown in FIG. 10, the fourth catalyst deterioration diagnosis device 10D includes a fourth CPU 30D. The fourth CPU 30D includes a fourth operation portion 32D, a fourth storage portion 34D, and a fourth input/output portion 36D. The fourth operation portion 32D includes a catalyst temperature obtaining portion 40, a first sensor output obtaining portion 42A, a second sensor output obtaining portion 42B, a conversion efficiency calculating portion 60, a fourth evaluative catalyst temperature storing portion 46D (indicated as "Tr4" in FIG. 10), a second evaluative conversion efficiency storing portion 62B (indicated as "Rc2" in FIG. 10), and a fourth deterioration diagnosis portion 48D.

That is, the fourth operation portion 32D executes programs stored in the fourth storage portion 34D to function as the catalyst temperature obtaining portion 40, the first sensor output obtaining portion 42A, the second sensor output obtaining portion 42B, the conversion efficiency calculating portion 60, the fourth evaluative catalyst temperature storing portion 46D, the fourth deterioration diagnosis portion 48D, and the second evaluative conversion efficiency storing portion 62B.

The catalyst temperature obtaining portion 40, the first sensor output obtaining portion 42A, the second sensor output obtaining portion 42B, and the conversion efficiency calculating portion 60 are not described here in detail because they have already been explained above.

The fourth evaluative catalyst temperature storing portion 46D stores a given fourth evaluative catalyst temperature Tr4 (e.g. 150° C.).

The second evaluative conversion efficiency storing portion 62B stores a second evaluative conversion efficiency Rc2. The second evaluative conversion efficiency Rc2 can be set as below. For example, in advance, by using a normal catalyst 16, a conversion efficiency obtained with the first sensor output So1 and the second sensor output So2 at the time when the catalyst temperature To has reached the preset fourth evaluative catalyst temperature Tr4 is obtained as a conversion efficiency Rca, and, by using a faulty catalyst 16, a conversion efficiency obtained with the first sensor output So1 and the second sensor output So2 at the time when the catalyst temperature has reached the preset fourth evaluative catalyst temperature Tr4 is obtained as a conversion efficiency Rcb. Then, the second evaluative conversion efficiency Rc2 is set such that Rcb<Rc2<Rca.

The second evaluative conversion efficiency Rc2 may be previously determined to be a conversion efficiency corresponding to a middle point between the conversion efficiencies Rca and Rcb, or may be set in the range between the conversion efficiencies Rca and Rcb according to the type of the combustion device 12 (the number of cylinders, etc.) or the kind of the catalyst 16, for example. Further, the second evaluative conversion efficiency Rc2 may be set in accordance with the amount of air contained in the exhaust from the combustion device 12, i.e. the amount of air fed to the catalyst 16. For example, the second evaluative conversion efficiency Rc2 is lowered as the amount of air increases, and the second evaluative conversion efficiency Rc2 is raised as the amount of air decreases.

The fourth deterioration diagnosis portion 48D determines that the catalyst 16 is faulty when the conversion efficiency Rc at the time when the catalyst temperature To obtained by the catalyst temperature obtaining portion 40 has reached the preset fourth evaluative catalyst temperature Tr4 is equal to or less than the preset second evaluative conversion efficiency Rc2.

Next, processing of the fourth catalyst deterioration diagnosis device 10D (fourth catalyst deterioration diagnosis method) will be described based on the flowchart of FIG. 12.

First, at step S301 of FIG. 12, the catalyst temperature obtaining portion 40 obtains the temperature To of the catalyst 16.

At step S302, the fourth deterioration diagnosis portion 48D determines whether the obtained catalyst temperature To is equal to the fourth evaluative catalyst temperature Tr4. The catalyst temperature To and the fourth evaluative catalyst temperature Tr4 are determined to be equal if the difference is within an error range (e.g. 5° C. or less). If the two are not equal, the processing at and after step S301 is repeated.

If the obtained catalyst temperature To is equal to the fourth evaluative catalyst temperature Tr4, then the process proceeds to step S303, where the first sensor output obtaining portion 42A obtains the first sensor output So1 from the first gas sensor 18A.

At step S304, the second sensor output obtaining portion 42B obtains the second sensor output So2 from the second gas sensor 18B.

At step S305, the conversion efficiency calculating portion 60 calculates the conversion efficiency Rc based on the obtained first sensor output So1 and second sensor output So2.

At step S306, the fourth deterioration diagnosis portion 48D determines whether the obtained conversion efficiency Rc is not greater than the previously stored second evaluative conversion efficiency Rc2. If it is equal to or less than the second evaluative conversion efficiency Rc2, the process proceeds to next step S307, where the fourth deterioration diagnosis portion 48D determines that the catalyst 16 is faulty.

If it is determined that the obtained conversion efficiency Rc is greater than the previously stored second evaluative conversion efficiency Rc2 at step S306, then the process proceeds to step S308, where the fourth deterioration diagnosis portion 48D determines that the catalyst 16 is normal.

In this way, the fourth catalyst deterioration diagnosis device 10D obtains the temperature To of the catalyst 16 disposed between the combustion device 12 and the exhaust port 14, obtains the first sensor output So1 from the first gas sensor 18A disposed between the combustion device 12 and the catalyst 16, and obtains the second sensor output So2 from the second gas sensor 18B disposed between the catalyst 16 and the exhaust port 14. Then, the catalyst 16 is determined to be faulty if the conversion efficiency Rc obtained with the first sensor output So1 and the second sensor output So2 at the preset fourth evaluative catalyst temperature Tr4 is equal to or less than the preset second evaluative conversion efficiency Rc2.

For example, it is assumed that the first gas sensor 18A and the second gas sensor 18B are each a NOx sensor and the fourth evaluative catalyst temperature Tr4 is 150° C. Then, by using a normal catalyst 16, the conversion efficiency obtained with the first sensor output So1 and the second sensor output So2 at the catalyst temperature To of 150° C. is obtained as a conversion efficiency Rca. Further, by using a faulty catalyst 16, the conversion efficiency obtained with the first sensor output So1 and the second sensor output So2 at the catalyst temperature of 150° C. is obtained as a conversion efficiency Rcb. Then, the second evaluative conversion efficiency Rc2 is determined such that Rcb<Rc2<Rca.

Then, the catalyst 16 is determined to be faulty if the conversion efficiency Rc obtained when the catalyst temperature To has reached the preset fourth evaluative catalyst temperature Tr4 is equal to or less than the preset second evaluative conversion efficiency Rc2.

The deterioration diagnosis method can solve problems of the fault detection that utilizes OSC (Oxygen Storage Capacity) described earlier, can highly accurately implement the deterioration diagnosis of the catalyst 16 in a short time, and is suitable also for on-board fault diagnostics. Especially, the search for To=Tr4 at steps S301 to S302 takes a shorter time (about less than 1 second) than the time required for the step of switching between lean and rich by OSC. Furthermore, the processing at and after step S303 is performed on the CPU and so the processing time is extremely short, only about 1 second. Accordingly, whether the catalyst 16 is faulty or normal can be detected in about 1 second.

Furthermore, the accuracy of the fault detection can be further improved by setting the second evaluative conversion efficiency Rc2 according to the amount of air fed to the catalyst 16.

The catalyst deterioration diagnosis device and the catalyst deterioration diagnosis method according to the present invention are not limited to the above-described embodiments and various configurations can of course be employed without departing from the scope of the present invention.

Also, in implementations of the present invention, various units for improving the reliability as car components may be added within a range where the idea of the present invention is not impaired.

What is claimed is:

1. A catalyst deterioration diagnosis device that diagnoses deterioration of a catalyst disposed on an exhaust side of a combustion device, the catalyst deterioration diagnosis device comprising:
   a unit configured to obtain a temperature of the catalyst;
   a unit configured to obtain a sensor output from a gas sensor disposed between the catalyst and an exhaust port; and
   a unit configured to determine the catalyst to be faulty when the temperature of the catalyst is obtained at an occurrence of the sensor output being substantially equal to a preset evaluative output and when the obtained temperature of the catalyst is equal to or higher than a preset evaluative catalyst temperature.

2. The catalyst deterioration diagnosis device according to claim 1, wherein the evaluative catalyst temperature is set according to an amount of air fed to the catalyst.

3. The catalyst deterioration diagnosis device according to claim 1, wherein the gas sensor is a NOx sensor or a HC sensor.

4. A catalyst deterioration diagnosis device that diagnoses deterioration of a catalyst disposed on an exhaust side of a combustion device, the catalyst deterioration diagnosis device comprising:
   a unit configured to obtain a temperature of the catalyst;
   a unit configured to obtain a sensor output from a gas sensor disposed between the catalyst and an exhaust port; and
   a unit configured to determine the catalyst to be faulty when the sensor output is obtained at an occurrence of the temperature of the catalyst being substantially equal to a preset evaluative catalyst temperature and when the obtained sensor output is equal to or greater than a preset evaluative output.

5. The catalyst deterioration diagnosis device according to claim 4, wherein the evaluative output is set according to an amount of air fed to the catalyst.

6. The catalyst deterioration diagnosis device according to claim 4, wherein the gas sensor is a NOx sensor or a HC sensor.

7. A catalyst deterioration diagnosis device that diagnoses deterioration of a catalyst disposed on an exhaust side of a combustion device, the catalyst deterioration diagnosis device comprising:
   a unit configured to obtain a temperature of the catalyst;
   a unit configured to obtain a first sensor output from a first gas sensor disposed between the combustion device and the catalyst;
   a unit configured to obtain a second sensor output from a second gas sensor disposed between the catalyst and an exhaust port; and
   a unit configured to determine the catalyst to be faulty when the temperature of the catalyst is obtained at an occurrence of a conversion efficiency obtained with the first sensor output and the second sensor output being substantially equal to a preset evaluative conversion efficiency and when the obtained temperature of the catalyst is equal to or higher than a preset evaluative catalyst temperature.

8. The catalyst deterioration diagnosis device according to claim 7, wherein the evaluative catalyst temperature is set according to an amount of air fed to the catalyst.

9. The catalyst deterioration diagnosis device according to claim 7, wherein the first gas sensor and the second gas sensor are each a NOx sensor or a HC sensor.

10. A catalyst deterioration diagnosis device that diagnoses deterioration of a catalyst disposed on an exhaust side of a combustion device, the catalyst deterioration diagnosis device comprising:
    a unit configured to obtain a temperature of the catalyst;
    a unit configured to obtain a first sensor output from a first gas sensor disposed between the combustion device and the catalyst;
    a unit configured to obtain a second sensor output from a second gas sensor disposed between the catalyst and an exhaust port; and
    a unit configured to determine the catalyst to be faulty when a conversion efficiency is obtained with the first sensor output and the second sensor output at an occurrence of the temperature of the catalyst being substantially equal to a preset evaluative catalyst temperature and when the obtained conversion efficiency is equal to or less than a preset evaluative conversion efficiency.

11. The catalyst deterioration diagnosis device according to claim 10, wherein the evaluative conversion efficiency is set according to an amount of air fed to the catalyst.

12. The catalyst deterioration diagnosis device according to claim 10, wherein the first gas sensor and the second gas sensor are each a NOx sensor or a HC sensor.

* * * * *